(12) United States Patent
Jansen et al.

(10) Patent No.: US 9,493,673 B2
(45) Date of Patent: *Nov. 15, 2016

(54) MANGANESE COMPLEX AS DRIER FOR COATING COMPOSITIONS

(75) Inventors: Johan Franz Gradus Antonius Jansen, Geleen (NL); Franciscus Adrianus Cornelis Bergman, Zwolle (NL); Engelina Catharina Kleuskens, Elsloo (NL)

(73) Assignee: DSM IP ASSETS B.V., Heerlen (NL)

( * ) Notice: Subject to any disclaimer, the term of this patent is extended or adjusted under 35 U.S.C. 154(b) by 802 days.

This patent is subject to a terminal disclaimer.

(21) Appl. No.: 13/578,026

(22) PCT Filed: Feb. 11, 2011

(86) PCT No.: PCT/EP2011/052073
§ 371 (c)(1),
(2), (4) Date: Jan. 29, 2013

(87) PCT Pub. No.: WO2011/098587
PCT Pub. Date: Aug. 18, 2011

(65) Prior Publication Data
US 2013/0123410 A1 May 16, 2013

(30) Foreign Application Priority Data
Feb. 11, 2010 (EP) ..................... 10153318

(51) Int. Cl.
| | | |
|---|---|---|
| C08K 5/34 | (2006.01) |
| C08K 5/3435 | (2006.01) |
| B05D 3/02 | (2006.01) |
| C09D 167/03 | (2006.01) |
| C08G 18/08 | (2006.01) |
| C09D 167/06 | (2006.01) |
| C09D 175/14 | (2006.01) |
| C09D 7/12 | (2006.01) |

(52) U.S. Cl.
CPC ......... *C09D 167/03* (2013.01); *C08G 18/0804* (2013.01); *C09D 7/1233* (2013.01); *C09D 167/06* (2013.01); *C09D 175/14* (2013.01)

(58) Field of Classification Search
None
See application file for complete search history.

(56) References Cited

U.S. PATENT DOCUMENTS 5,274,147 A 12/1993 Kerschner et al.
5,429,769 A * 7/1995 Nicholson et al. ........... 510/376

FOREIGN PATENT DOCUMENTS

| WO | WO 03/093384 A1 * | 11/2003 |
| WO | 2008/003652 | 1/2008 |
| WO | 2012/079624 | 6/2012 |

OTHER PUBLICATIONS

International Search Report for PCT/EP2011/052073, mailed Jun. 24, 2011.
Written Opinion for PCT/EP2011/052073, mailed Jun. 24, 2011.
Oyman et al., "A promising environmentally-friendly manganese-based catalyst for alkyd emulsion coatings", *Polymer*, vol. 45, Sep. 11, 2004, pp. 7431-7436.
Wieghardt et al., "Synthesis, Crystal Structures, Reactivity, and Magnetochemistry of a Series of Binuclear Complexes of Manganese(II), -(III), and (-IV) of Biological Relevance", *J. Am. Chem. Soc.*, vol. 110, No. 22, 1988, pp. 7398-7411.

* cited by examiner

*Primary Examiner* — Susannah Chung
*Assistant Examiner* — Robert T Butcher
(74) *Attorney, Agent, or Firm* — Nixon & Vanderhye P.C.

(57) ABSTRACT

An air drying auto-oxidizable resin composition comprising components: a) a drier comprising a manganese carboxylate complex, and b) a polymer comprising unsaturated fatty acid residues, wherein the manganese carboxylate complex a) has the following structure I: wherein $R_1$=H, C1-C20 alkyl optionally substituted with heteroatoms, or C6-C20 aryl optionally substituted with heteroatoms; X and Y are independently selected from O and $OC(R_3)O$, in which a=4 when X=O, and a=3 when X=$OC(R_3)O$, and in which b=4 when Y=O, and b=3 when Y=$OC(R_3)O$; $R_2$=C1-C20 alkyl optionally substituted with heteroatoms, C6-C20 aryl optionally substituted with heteroatoms, or a polymeric residue; and $R_3$=C1-C20 alkyl optionally substituted with heteroatoms, C6-C20 aryl optionally substituted with heteroatoms, or a polymeric residue.

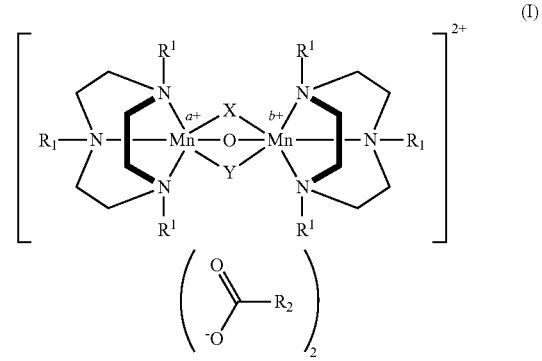

9 Claims, No Drawings

MANGANESE COMPLEX AS DRIER FOR COATING COMPOSITIONS

This application is the U.S. national phase of International Application No. PCT/EP2011/052073 filed 11 Feb. 2011 which designated the U.S. and claims priority to EP Patent Application No. 10153318.0 filed 11 Feb. 2010, the entire contents of each of which are hereby incorporated by reference.

The invention is directed to the use of a specific Mn complex as a drier in an auto-oxidisable coating composition, to an auto-oxidisable coating composition comprising such drier, to the use of said composition and to a substrate coated with said composition.

The use of fatty acid functionalised resins in paint products has the advantage that the resins are largely derivable from agricultural products, which are renewable sources. They are also easily biodegraded when buried in landfill sites which is advantageous. Furthermore upon drying the fatty acid derived polymers yield coatings with very good hydrolytic stability which is very advantageous for outdoor uses.

Coatings for professional and do-it-yourself use are subject to increasing technical and ecological restrictions, including the nature of the drier. A drier is for example a metal salt which acts as a catalyst for the auto-oxidation reaction which is initiated on drying. Other known synonyms for drier in the art include siccative, desiccator or desiccative. Examples of known drier salts include polyvalent salts containing cobalt, calcium, copper, zinc, iron, zirconium, manganese, barium, zinc, strontium, lithium and potassium as the cation; and halides, nitrates, sulphates, carboxylates like acetates, ethylhexanoates, octanoates and naphthenates or acetoacetonates as the anion. Nowadays, driers used for auto-oxidisable coating composition are mainly based on Co catalysts as primary dryers.

However, for reasons of environmental protection, in the last years there is a new aim to replace these cobalt-based catalysts with more environmentally friendly alternatives for use in coatings comprising an auto-oxidisable resin.

Simple Mn based catalysts like Mn ethylhexanoate combined with acetylacetonate ligands and bipyridine used as driers has been described for example by E. Bouwman, R. van Gorkum, J. Coat. Technol. Res., 4, 491-503 (2007). However, experimental results have shown that such Mn systems do not allow sufficient drying in a coating composition comprising an alkyd resin, especially in relation to tack free time. Furthermore when employing such a drying system the coatings suffers from severe dark yellowing which renders them less useful.

Other ligands with aliphatic and aromatic amines are also known, as for instance in the paper of R. van Gorkum Et al., in J. Catalysis 252 110-118 (2007). Upon evaluation of these driers it was found that they are not as active as the above described Mn/bipyridine/acetylacetone system.

In the article of Z. O. Oyman et al entitled "A promising environmentally friendly manganese based catalyst for alkyd emulsion coatings", Polymer, vol. 45, 11 Sep. 2004, pg. 7431-7436 there is presented a bimetallic Mn structure $[Mn^{IV}_2(MeTACN)_2(\mu\text{-}O)_3](PF_6)_2$ used for alkyd coatings. However, also alkyd coatings comprising such Mn based catalysts do not dry with a desired efficiency, as shown herein with comparative example A under Table 1 of the experimental section.

A general problem with alternative catalysts is that they either do not work well in drying (as discussed above) or they may induce undesired yellowing of the coating especially yellowing in the dark. Moreover, often there is a storage stability problem related to a skin formation inside the pot comprising the coating composition, for which additional antiskinning compounds are needed in the coating composition.

Therefore, there remains a strong need for other driers for auto-oxidisable coating compositions to be able to formulate coatings without serious adverse effect on coating properties, particularly allowing fast drying.

It is the object of the invention to provide a drier which is environmentally friendly and ensures the desired properties of an auto-oxidisable coating composition comprising such drier, as described above. Another object of the invention is to provide an auto-oxidisable coating composition having after drying one or more of the following properties advantageous for different types of applications, such as low yellowing, no skin formation or low skin formation, high solids content, short dust free and/or tack free time.

The inventors surprisingly found that one or more of these objects may be met by using a specific transition metal complex as a drier for air drying auto-oxidisable resin compositions. This is especially surprising since by changing the anion from $(PF_6^-)_2$ of the manganese catalyst as known from the article of Oyman to an carboxylate analogous, resulted in changing from poor/mediocre drying properties to good drying properties for the air drying auto-oxidisable resin compositions according to the invention.

Accordingly, in a first aspect the invention is directed to an air drying auto-oxidisable resin composition comprising components:
  a) a drier comprising a manganese carboxylate complex, and
  b) a polymer comprising unsaturated fatty acid residues,
wherein the manganese carboxylate complex has the following structure I:

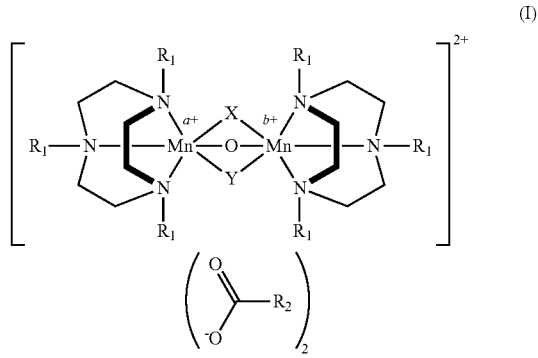

wherein
$R_1$=H, C1-C20 alkyl optionally substituted with heteroatoms, or C6-C20 aryl optionally substituted with heteroatoms;
X and Y are independently selected from O and $OC(R_3)O$, in which a=4 when X=O, and a=3 when X=$OC(R_3)O$, and in which b=4 when Y=O, and b=3 when Y=$OC(R_3)O$;
$R_2$=C1-C20 alkyl optionally substituted with heteroatoms, C6-C20 aryl optionally substituted with heteroatoms or a polymeric residue; and
$R_3$=C1-C20 alkyl optionally substituted with heteroatoms, C6-C20 aryl optionally substituted with heteroatoms, or a polymeric residue.

In another aspect the invention is related to the use of at least a manganese carboxylate complex of structure I as a drier for air drying auto-oxidative resin compositions comprising a polymer b) comprising unsaturated fatty acid residues.

Another aspect the invention is directed to an air drying auto-oxidisable resin composition comprising:
a) a drier comprising manganese carboxylate complex with the structure according to formula I above;
b) a polymer comprising unsaturated fatty acid residues, and
c) a liquid medium.

The present inventors have found that favorable properties can be achieved by using a manganese carboxylate complex according to formula I as a drier. It was found that the air drying auto-oxidisable resin composition of the invention has a very good drying behaviour, especially concerning the dust free and the tack free drying. Furthermore, additional advantages observed where a minimal yellowing and no skin formation when the composition was stored in a pot for several weeks (i.e. the auto-oxidisable resin composition stayed liquid for a relatively long period when standard antiskinning agents were used).

In the resin composition according to the invention the manganese carboxylate complex preferably has the following structure II:

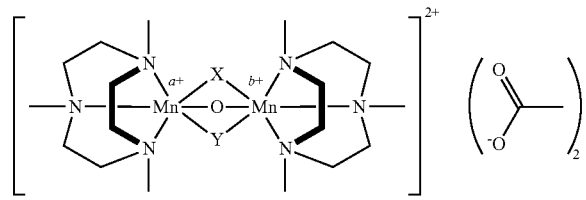

(II)

wherein
X, Y are independently selected from O and OC($R_3$)O, in which a=4 when X=O, and a=3 when X=OC($R_3$)O, and in which b=4 when Y=O, and b=3 when Y=OC($R_3$)O,
$R_3$=C1-C20 alkyl optionally substituted with heteroatoms, C6-C20 aryl optionally substituted with heteroatoms, or a polymeric residue.

In the resin composition according to the invention the manganese carboxylate complex preferably has the following structure III:

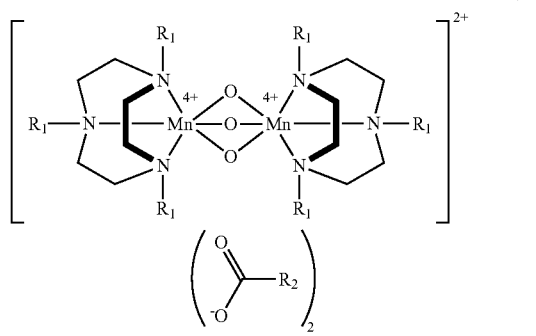

(III)

wherein
$R_1$=H, C1-C20 alkyl optionally substituted with heteroatoms, C6-C20 aryl optionally substituted with heteroatoms; and
$R_2$=C1-C20 alkyl optionally substituted with heteroatoms, C6-C20 aryl optionally substituted with heteroatoms, or a polymeric residue.

In the resin composition according to the invention the manganese carboxylate complex preferably has the following structure IV:

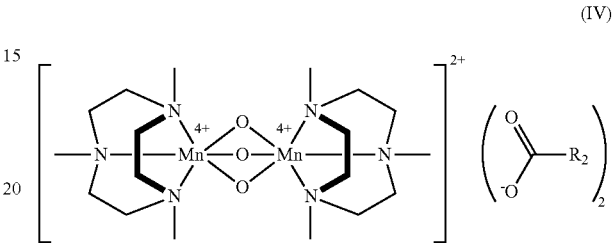

(IV)

wherein
$R_2$=C1-C20 alkyl optionally substituted with heteroatoms, C6-C20 aryl optionally substituted with heteroatoms, or a polymeric residue.

In the resin composition according to the invention the manganese carboxylate complex preferably has the following structure V:

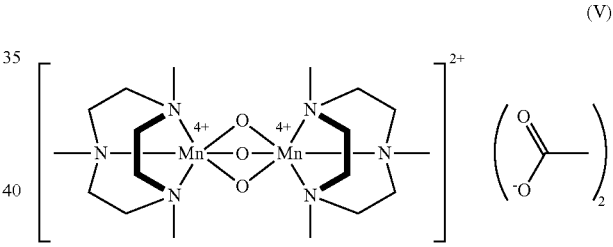

(V)

In the resin composition according to the invention the manganese carboxylate complex preferably has the following structure VI:

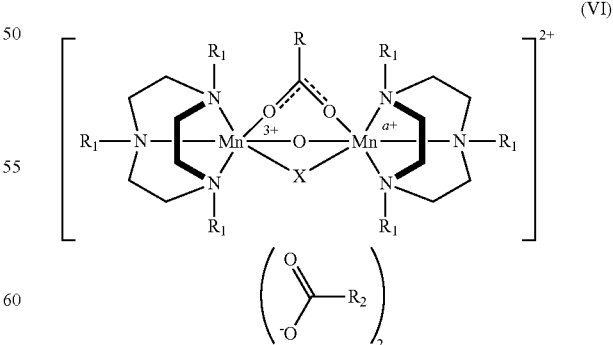

(VI)

wherein
R=C1-C20 alkyl optionally substituted with heteroatoms, C6-C20 aryl optionally substituted with heteroatoms, or a polymeric residue;

R$_1$=H, C1-C20 alkyl optionally substituted with heteroatoms, or C6-C20 aryl optionally substituted with heteroatoms;
X=O or OC(R$_3$)O in which a=4 when X=O, and a=3 when X=OC(R$_3$)O;
R$_2$=C1-C20 alkyl optionally substituted with heteroatoms, C6-C20 aryl optionally substituted with heteroatoms or a polymeric residue; and
R$_3$=C1-C20 alkyl optionally substituted with heteroatoms, C6-C20 aryl optionally substituted with heteroatoms, or a polymeric residue.

In the resin composition according to the invention preferably the amount of the cation of the manganese carboxylate complex, including where present also the polymeric residue, is ≥0.00001 wt %, more preferably ≥0.0001 wt % and most preferably ≥0.001 wt %, based on the total solids content of the resin (polymer) comprising unsaturated fatty acid residues. Preferably the amount of the manganese carboxylate complex is ≤5 wt %, more preferably ≤2.5 wt %, even more preferably ≤1 wt % and most preferably ≤0.5 wt % based on the total solids content of the polymer comprising unsaturated fatty acid residues. These upper and lower wt % limits may be combined in any manner.

The amount of the manganese carboxylate complex may also be expressed in terms of mmol manganese metal per kg of total resin composition, excluding volatile organic compounds i.e. mmol Mn/kg solid resin. Preferably the amount of the manganese is in a range from 0.00004 to 200 mmol Mn/kg solid resin more preferably in the range from 0.004 to 150 mmol Mn/kg solid resin more preferably in the range of 0.01 to 100 mmol Mn/kg solid resin.

With total solids content of the polymer comprising unsaturated fatty acid residues is understood the resin without diluents. Polymer and resin are herein interchangeable terms.

R in the above formulas may be a polymeric residue. This is the case when the Mn complex is prepared in situ with the polymer b). In case R is a polymeric residue, the residue may originate for example from an acid functional polymer. In a preferred embodiment in which R is a polymeric residue, the manganese carboxylate complex is prepared in situ with an unsaturated fatty acid modified polymer. In an especially preferred embodiment the fatty acid modified polymer comprises some remaining carboxylic acid groups.

Preferably R$_1$=C1-C6 alkyl, more preferably R$_1$ is methyl.

By protected aminoacids used for group R$_3$ herein is meant a compound of formula VII:

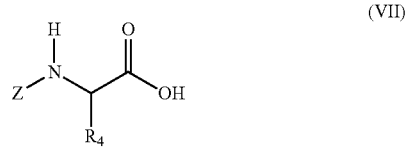

(VII)

where Z is a carbamate group, preferably carbobenzyloxy (Cbz) or tertiarybutoxy carbonyl (Boc) and R$_4$=H, C1-C10 alkyl, alkylaryl, C6-C1-aryl optionally further substituted with heteroatoms.

Combinations of different types of the manganese carboxylate complex drier according to formula I are included for the purpose of this invention. Also combinations of any manganese carboxylate complex drier according to formula I and other driers are included for the purpose of this invention.

The manganese carboxylate complex according the invention may during the process of drying go through various intermediate states in which it may still be active. In the context of the invention it is also included that integers a or b from the above defined structures of the manganese carboxylate complex according to the invention may change during drying to have the value 2 (for example the manganese complex having a=2 and b=4, or the reverse, may be an active intermediate species in the drying process as well).

In accordance with the air drying auto-oxidisable resin composition of the invention, any type of polymer b) comprising unsaturated fatty acid residues or mixtures thereof may be used. The polymer in the air drying auto-oxidisable resin composition may be for instance selected from alkyds, vinyl polymers, polyurethane resins, hyperbranched resins and mixtures thereof.

Polymer b) must comprise unsaturated fatty acid residues to ensure the air drying properties, however it may further comprise saturated fatty acid residues (i.e. groups) and other functional groups. Preferably the fatty acid residue is a carboxylic acid with a C12 to C30 carbon atom chain.

Saturated and unsaturated fatty acid groups may be obtained from natural and/or artificial sources. Natural sources include animal sources and/or plant sources. Animal sources may comprise animal fat, butter fat, fish oil, lard, liver fats, sperm whale oil and/or tallow oil and waxes. Examples of waxes are beeswax, candelia and/or montan. Plant sources may comprise waxes and/or oils such as vegetable oils and/or non-vegetable oils. Examples of plant oils are: bitter gourd, borage, calendula, canola, castor, china wood, coconut, conifer seed, corn, cottonseed, dehydrated castor, flaxseed, grape seed, *Jacaranda mimosifolia* seed, linseed, olive, palm, palm kernel, peanut, pomegranate seed, rapeseed, safflower, snake gourd, soya(bean), sunflower, tung, and/or wheat germ. Artificial sources include synthetic waxes (such as micro crystalline and/or paraffin wax), distilling tall oil (a by-product of processing pine wood) and/or synthesis (for example by chemical and/or biochemical methods). Suitable fatty acids also include (Z)-hexadan-9-enoic [palmitoleic] acid ($C_{16}H_{30}O_2$), (Z)-octadecan-9-enoic [oleic] acid ($C_{18}H_{34}O_2$), (9Z,11E,13E)-octadeca-9,11,13-trienoic [α(alpha)-eleostearic also α-oleostearic] acid ($C_{18}H_{30}O_2$) (where α-eleostearic acid comprises >65% of the fatty acids of tung oil), licanic acid, (9Z,12Z)-octadeca-9,12-dienoic[linoleic]acid ($C_{18}H_{32}O_2$), (5Z,8Z,11Z,14Z)-eicosa-5,8,11,14-tetraenoic acid [arachidonic acid] ($C_{20}H_{32}O_2$), 12-hydroxy-(9Z)-octadeca-9-enoic [ricinoleic] acid ($C_{18}H_{34}O_3$), (Z)-docosan-13-enoic [erucic] acid ($C_{22}H_{42}O_2$), (Z)-eicosan-9-enoic [gadoleic] acid ($C_{20}H_{38}O_2$), (7Z,10Z,13Z,16Z,19Z)-docosa-7,10,13,16,19-pentaenoic [clupanodonic] acid and/or combinations thereof.

Unsaturated and saturated fatty acid residues may be obtained from a plurality of the above sources and/or other sources not listed herein.

Suitable drying unsaturated fatty acids, semi-drying fatty acids or mixture thereof, useful herein, are ethylenically unsaturated conjugated or non-conjugated C2-C24 carboxylic acids, such as myristoleic, palmitoleic, arachidonic, erucic, gadoleic, clupanadonic, oleic, ricinoleic, linoleic, linolenic, licanic, nisinic acid and eleostearic acids or mixture thereof, typically used in the form of mixtures of fatty acids derived from natural or synthetic oils. By semi-drying and drying fatty acids is meant fatty acids that have the same fatty acid composition as the oils they are derived from. The classfication of the oils is based on the iodine number; for drying oil the iodine number is >140; for semi-drying oil the iodine number is ranging between 125 and 140, and for non-drying oil the iodine number is <125 ("Surface Coatings", by Swaraj Paul, John Wiley and Sons; p.89).

Suitable unsaturated fatty acids for providing fatty acid groups in the polymer b) include fatty acids derived from soybean oil, conjugated soybean oil, palm oil, linseed oil, tung oil, rapeseed oil, sunflower oil, conjugated sunflower oil, calendula oil, wood oil, tallow oil, (dehydrated) castor oil, safflower oil, tuna fish oil, coconut oil and dehydrated coconut oil, and combinations thereof.

Polymer b) may comprise any amount of unsaturated fatty acid residues, which amount will also depend on the polymer type. Preferably the polymer b) comprises ≥20 wt %, preferably ≥40 wt %, more preferably ≥50 wt %, even more preferably ≥60 wt %, especially preferably ≥70 wt % and most preferably ≥80 wt % of unsaturated fatty acid residues based on the total solids content of the polymer b).

Besides the unsaturated fatty acid residues, other functional groups may be attached to the auto-oxidisable resin by means of any well known reactions. Functional groups may be introduced into the auto-oxidisable resin using two general methods: i) by utilising in the polymerisation process to form an auto-oxidisable resin, monomers carrying the functional group; or ii) utilising monomers bearing selected reactive groups and which monomer is subsequently reacted with a compound carrying the functional group and also a reactive group of the type which will react with the selected reactive groups on the monomer to provide attachment of the functional group to the auto-oxidisable resin via covalent bonding.

Other monomers bearing functional groups which may be incorporated in or mixed with the auto-oxidisable resin are for instance monomers comprising (meth)allyl, propargyl, vinyl, (meth)acryl, maleic, fumaric, itaconic functionalities, β-keto ester groups, β-keto amide groups and any combinations thereof.

Polymer b) may be for example any conventional alkyd resin. By alkyd resin herein is meant a resin prepared from the reaction of a polyhydric alcohol, a polybasic acid and an unsaturated oil or fatty acid to give an unsaturated fatty acid residue containing ester. The unsaturation in the ester polyol imparts latent cross-linkability upon auto-oxidation so that when a coating composition thereof is dried in the air, in conjunction with the drier salt, the coating material undergoes cross-linking (by auto-oxidation) and thereby improving its properties, for example its chemical resistance, hardness and/or durability.

Another example of a polymer b) may be a vinyl polymer comprising unsaturated fatty acid groups. By vinyl polymer herein is meant a polymer comprising ethylenically unsaturated monomers, also known as (poly)acrylate. In an embodiment according to the invention, unsaturated fatty acid groups can be incorporated in the vinyl polymer via fatty acid functional monomers (GMA-fatty acid adduct, such as described in U.S. Pat. No. 6,599,972, U.S. Pat. No. 6,624,223, WO2007/042684 and U.S. Pat. No. 3,988,273) or via the reaction of epoxy groups (introduced in the backbone) and the acid groups of the fatty acid (such as described in U.S. Pat. No. 7,235,603).

Another example of a polymer b) suitable for the air drying auto-oxidisable resin composition of the invention may be polyurethanes functionalized with non-activated double bonds in which, for example, fatty acid is incorporated via a polyester polyol which contains fatty acid.

In yet another embodiment the auto-oxidisable alkyd resin comprises a hyperbranched resin or a modified hyperbranched resin. Hyperbranched macromolecules are often referred to as dendritic species in the art. Hyperbranched macromolecules are three-dimensional highly branched molecules having a tree-like structure. Macromolecules designated as dendrimers are highly symmetric and belong to a particular class of hyperbranched molecules that have a polydispersity index of approximately 1, whereas macromolecules designated as hyperbranched may to a certain degree be asymmetric and yet maintain a tree-like structure. WO 2007/147559 describes water soluble unsaturated fatty acid functional hyperbranched polyamides.

As a particular concept, the polymer b) may have a backbone of for instance a polyester, polyurethane or vinyl type and OH or other reactive functionalities incorporated such as the unsaturated fatty acid residues can attach to the reactive groups.

The OH-functional polymeric backbone is preferably a polymeric polyol of functionality more than 2, but may be or include a polymeric diol. Such polyol in principle may be selected from any of the chemical classes of polymeric polyols used or proposed to be used in a urethanised resin synthesis. In particular the polymeric polyol may be a polyester polyol, a polyesteramide polyol, a polyether polyol, a polythioether polyol, a polycarbonate polyol, a polyacetal polyol, a polyvinyl polyol and/or a polysiloxane polyol. More preferably the polymeric polyol is selected from a polyester polyol, a polyether polyol and/or a polysiloxane polyol, and particularly preferably is selected from a polyether polyol and/or a polyester polyol.

Conventional air-drying alkyds can be obtained by a polycondensation reaction of one or more polyhydric alcohols, one or more polycarboxylic acids or the corresponding anhydrides, and long chain unsaturated fatty acids or oils. The unsaturated groups in the auto-oxidisable resin can be introduced by the unsaturated fatty acids, but may, alternatively or additionally, be introduced by one or more of the polyols, carboxylic acids or anhydrides or other building blocks used, such as fatty mono-alcohols.

The ester can comprise one or more polyol building blocks, such as diols or triols. Suitable monofunctional alcohols include for example eicosanol and lauryl alcohol. Polyols with two hydroxy groups per molecule include diols such as ethylene glycol, diethylene glycol, dipropylene glycol, 1,2-ethanediol, 1,3-propane diol, 1,4-butanediol, 1,6-hexane diol, 1,12-dodecane diol, 3-methyl-1,5-pentane diol, 2,2,4-trimethyl-1,6-hexane diol, 2,2-dimethyl-1,3-propane diol (neopentyl glycol), 2-methyl-2-cyclohexyl-1,3-propane diol or 2-ethyl-2-butyl-1,3-propane diol, 1,2-, 1,3- and 1,4-cyclohexanediols and the corresponding cyclohexane dimethanols, and diols such as alkoxylated bisphenol A products, e.g. ethoxylated or propoxylated bisphenol A.

Examples of suitable polyols having 3 or more hydroxyl groups include glycerol, pentaerythritol, di-, tri-, and tetra-pentaerythritol, diethylene glycol, propylene glycol, neopentyl glycol, sorbitol, trimethylol propane (TMP), trimethylol ethane and di-trimethylol propane,1,1,1-tris (hydroxymethyl)ethane (TME), bis-TMP, bis-pentaerythritol and sorbitol (1,2,3,4,5,6-hexahydroxyhexane).

Polycarboxylic acids or their corresponding ester forming derivatives such as anhydrides, acid chlorides, or lower alkyl esters, used to synthesise alkyds, comprise aromatic, aliphatic and cycloaliphatic components, which are generally derived from petrochemical feedstocks. Typical examples of such polyacids include phthalic acid isophthalic acid, terephthalic acid, 5-tert-butyl isophthalic acid, trimellitic acid, pyromellitic acid, pimelic acid, adipic acid, azelaic acid, sebacic acid, maleic acid, fumaric acid, citric acid, mesaconic acid, citraconic acid, tetra-hydrophthalic acid, malonic acid, succinic acid, itaconic acid, isophthalic acid, carbonic acid, nonanedioic acid, decanedioic acid, naphthalene dicarboxylic acid, cyclohexane dicarboxylic acid, 2,2,4-trimethyl adipic acid, dimerized fatty acids, cyclopentane-1,2-dicarboxylic acid, 1,4-cyclohexanedicarboxylic acid, 1,3-cyclohexanedicarboxylic acid, 5-sodiosulpho isophthalic acid, cyclohexane-1,2-dicarboxylic acid, 4-methylcyclohexane-1,2-dicarboxylic acid, endomethylene-cyclohexane-1,2-dicarboxylic acid, butane-1,2,3,4-tetra-carboxylic acid, endoisopropylidene-cyclohexane-1,2-dicarboxylic acid, cyclohexane-1,2,4,5-tetracarboxylic acid, butane-1,2,3,4-tetracarboxylic acid or their anhydrides. If so desired, the carboxylic acids in question may be used as anhydrides or in the form of an ester, e.g., an ester of an alcohol having 1-4 carbon atoms. Anhydrides include succinic, maleic, phthalic, trimellitic and hexahydrophthalic anhydrides.

Optionally, the auto-oxidisable resin may comprise other building blocks, which can for example be derived from monocarboxylic acids such as pivalic acid, 2-ethylhexanoic acid, lauric acid, palmitic acid, stearic acid, 4-tert-butylbenzoic acid, cyclopentane carboxylic acid, naphthenic acid, cyclohexane carboxylic acid, 2,4-dimethyl benzoic acid, 2-methyl benzoic acid, benzoic acid, 2,2-dimethylol propionic acid, tetrahydrobenzoic acid, and hydrogenated or non-hydrogenated abietic acid or its isomer. If so desired, the monocarboxylic acids in question may be used wholly or in part as triglyceride, e.g., as vegetable oil, in the preparation of the alkyd resin. If so desired, mixtures of two or more of such monocarboxylic acids or triglycerides may be employed.

The auto-oxidisable resin may contain bound hydrophilic water-dispersing groups. The types of hydrophilic water-dispersing groups are well known in the art, and can be ionic water-dispersing groups or non-ionic water-dispersing groups. Preferred non-ionic water-dispersing groups are polyalkylene oxide groups, more preferably polyethylene oxide groups.

The alkyd resins can be obtained by direct esterification of the constituent components (such as an alcohol, a diacid and an unsaturated oil or unsaturated fatty acid), with the option of a portion of these components having been converted already into ester diols or polyester diols. Alternatively, the unsaturated fatty acids can be added in the form of a drying oil, such as sunflower oil, linseed oil, tuna fish oil, dehydrated castor oil, coconut oil, and dehydrated coconut oil.

Transesterification with the polyols and, optionally, other building blocks will then give the final alkyd resin. This transesterification generally takes place at a temperature in the range of 115 to 250° C., optionally with solvents such as toluene and/or xylene also present. The reaction may be carried out in the presence of a catalytic amount of the catalyst according to the invention. The esterification polymerisation processes for making the alkyd resin for use in the invention composition are well known in the art and need not be described here in detail. The auto-oxidisable resin can for instance also have pendant groups.

General processes for the preparation of alkyd polyesters are described in "Alkyd Resin Technology" by T C Patton, Publisher John Wiley & sons Inc. (1962). General methods for preparing crosslinkable polyesters are also disclosed in EP 486092, U.S. Pat. No. 3,494,882, U.S. Pat. No. 4,251,406, EP 0000087, WO 95/02019, U.S. Pat. No. 5,378,757 and GB 2306489.

The polyester may be modified with for example silicones (better outdoor durability), polyamides (to impart thixotropy) or phenolic and or colophonium resins (to increase Tg and hence hardness), styrene and/or vinyl toluene followed by polymerization of these monomers, in order to raise the Tg and bring about quick film setting. Herein the term alkyd resin is also meant to include such modified alkyds for specific applications, like for instance silicon based alkyds, thixotropic alkyds and urethane modified alkyds. The auto-oxidisable alkyd resin is preferably based on a polyester selected from the group consisting of pure polyester resin (i.e. does not contain urethane and/or amide groups), polyesteramide resin, urethanised polyester resin, urethanised polyesteramide resin and mixtures thereof. More preferably the polyester resin is selected from the group consisting of polyesteramide resin, urethanised polyester resin, urethanised polyesteramide resin and mixtures thereof.

The auto-oxidisable alkyd resin may be dispersed in water using techniques well known in the art. The auto-oxidisable alkyd resin normally does not require the use of an external surfactant (a type of dispersing agent) when being dispersed into water because it contains polymer bound dispersing groups. Surfactants may be utilised in order to assist in the dispersion of the auto-oxidisable alkyd resin in water. Suitable surfactants include but are not limited to conventional anionic, cationic and/or non-ionic surfactants.

Alkyds are often characterized by their oil length. Oil length is defined as the weight percentage of fatty acid building blocks (calculated as their triglycerides) in the alkyd resin. Thus, the oil length is defined as the number of grams of fatty acid (calculated as its triglyceride) used to produce 100 g of the alkyd resin. Long oil lengths (55% or higher) result in improved oxidative drying, good substrate adhesion, excellent flow properties, good solubility in aliphatic solvents, and low viscosity, even with low solvent content. However, these alkyds show strong yellowing. Medium oil length alkyds (40-55%) also have good solubility but show a higher viscosity. Paint films made of medium oil length alkyds have better mechanical properties such as hardness and durability. Short oil length alkyds (less than 40%) require additional measures, such as the use of additional siccatives or amino resins, to obtain acceptable drying times. The catalyst according to the present invention can be used with alkyds of any oil length.

Preferably the alkyds described herein have a final polymer acid value of from 1 to 20 mg KOH/g resin, making them thus also suitable for the preparation of the Mn complex drier in situ with the alkyd resin.

The vinyl polymer is an auto-oxidisable vinyl polymer prepared by polymerisation of vinyl monomers. By a vinyl monomer herein is meant an olefinically unsaturated monomer.

The vinyl auto-oxidisable polymer may be prepared from free radically polymerisable olefinically unsaturated monomer(s), and can contain polymerised units of a wide range of such monomers, especially those commonly used to make binders for the coatings industry. By a vinyl polymer herein is meant a homo- or co-polymer derived from addition polymerisation, using a free radical initiated process which may be carried out in an aqueous or non-aqueous medium, of one or more olefinically unsaturated monomers.

The vinyl auto-oxidisable polymer or is preferably prepared by free radical polymerisation, although in some circumstances anionic polymerisation may be utilised. The free radical polymerisation can be performed by techniques known in the art, for example as mini-emulsion or emulsion polymerisation, solution polymerisation, suspension polymerisation or bulk polymerisation. A free-radical polymerisation of vinyl monomer(s) to form a crosslinkable vinyl auto-oxidisable polymer or precursor vinyl auto-oxidisable polymer will require the use of a free-radical-yielding initiator(s) to initiate the vinyl polymerisation.

Examples of vinyl monomers which may be used to form a vinyl polymer include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl ethers, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula $CH_2=CR^4-COOR^5$, wherein $R^4$ is H or methyl and $R^5$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethyl methacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic, sulphonic and/or dicarboxylic acids, such as acrylic acid, methacrylic acid, β-carboxy ethyl acrylate, fumaric acid and itaconic acid, (meth)acrylamide, methoxypolyethyleneoxide(meth)acrylate may also be used.

The vinyl monomer may optionally contain functional groups to contribute to the crosslinking of the vinyl polymer(s) in the coating. Examples of such groups include maleic, epoxy, fumaric, acetoacetoxy, β-diketone, unsaturated fatty acid, acryloyl, methacrylol, styrenic, (meth)allyl groups, mercapto groups, keto or aldehyde groups (such as methylvinylketone, diacetoneacrylamide and (meth)acrolein).

Preferred is a vinyl polymer with a backbone made from a monomer system comprising at least 40 weight % of one or more monomers of the formula $CH_2=CR^1COOR^2$ as defined above. Such a preferred backbone for the vinyl polymer is defined herein as an (meth)acrylic polymer. A particularly preferred vinyl auto-oxidisable polymer is an acrylic auto-oxidisable polymer (i.e. based predominantly on at least one ester of acrylic or methacrylic acid). More preferably, the monomer system for the vinyl backbone contains at least 50 wt % of such monomers, and particularly at least 60 wt. %. The other monomer(s) in such acrylic auto-oxidisable polymer (if used) may include one or more of the other vinyl monomers mentioned above, and/or may include ones different to such other monomers. Particularly preferred monomers include butyl acrylate (all isomers), butyl methacrylate (all isomers), methyl methacrylate, ethyl hexyl methacrylate, esters of (meth)acrylic acid, acrylonitrile, vinyl acetate and styrene. Alternatively vinyl functional monomers with an auto-oxidisable moiety can be used, like the reaction product of GMA and fatty acid or SerAD FX521 ex Servo Condea.

Monomers which are useful for grafting the fatty acid onto the vinyl polymer to give fatty acid residues include hydroxyalkyl(meth)acrylates, such as hydroxyethyl(meth) acrylate, hydroxypropyl(meth)acrylate and ToneM-100 and epoxy functional vinyl monomers like glycidyl(meth)acrylate (GMA) or 3,4-epoxy-cyclohexylmethyl-acrylate.

Preferably the acid value of the vinyl polymer is in the range of from 0 to 60 mg KOH/g polymer, more preferably from 5 to 55 mg KOH/g, even more preferably from 10 to 45 mg KOH/g and most preferably from 15 to 35 mg KOH/g polymer.

Polyurethane polymers generally contain carbamate groups, (—NHCOO—), also referred to herein as urethane groups, and urea groups $(CO(NH_2))$ in their backbone structure. They are typically formed by the reaction of a diisocyanate with a polyol and polyamines.

Auto-oxidisable aqueous polyurethane dispersions may be obtainable by reacting drying and/or semidrying oils with low molar mass hydroxy compounds having two or more hydroxyl groups to give compounds which contains on average at least one hydroxyl group and at least one radical of a fatty acid having at least one olefinic double bond, then reacting these compounds together with polyols, with compounds which have at least two isocyanate-reactive groups and at least one acid group or at least one group which, after neutralisation, forms a cationic group, like, for example, an ammonium group, with polyfunctional isocyanates. If desired, the prepolymer is then reacted with a compound which has an isocyanate-reactive group, followed by neutralizing the product formed with tertiary amines or monofunctional acids and transferring the utilized product to the aqueous phase, and subsequently, if desired, reacting any excess isocyanate groups still present by adding chain extenders, which have at least two primary or secondary amino groups or hydrazine groups per molecule.

Suitable isocyanates used as building blocks for the auto-oxidisable polyurethane resin are for example diisocyanates, such as 1,6-hexane diisocyanate, isophorone diisocyanate, toluene diisocyanate, diphenyl diisocyanate, and dicyclo-hexylmethane diisocyanate. Triisocyanates can also be used.

A hyperbranched polyesteramide resin is a polymer having branched structure with a high functionality obtained by the polycondensation of for example anhydride with an alkanol-amine. Functionality is understood to be the average number of reactive groups of a certain type per molecule in the resin composition. For details regarding the compounds and the processes used to produce polyesteramide in general, patent WO 99/16810 can be consulted as reference.

The three components from which the polyesteramide resin is generally prepared are at least one anhydride, at least one alkanol-amine and at least one fatty acid. Preferably, unsaturated fatty acids or mixtures of fatty acids that contain also unsaturated fatty acids can be used, in order to achieve the airdrying property of the polyesteramide resin determined by the presence of the double bonds within the fatty acid chains.

An auto-oxidisable hyperbranched resin may be formed by a condensation reaction of for examples molecules having acid or anhydride functionalities with molecules having amine functionalities. By having more than one of such functional groups polymers may be formed. By having even more functional groups it is possible to form hyperbranched amide group containing resins as are well known in the art.

The alkanol-amine may be a monoalkanol-amine, a dialkanol-amine, a trialkanol-amine or a mixture of any of them. The degree of branching can be set via the alkanol-amines chosen. Highly branched structures with high functionality use as starting compounds di- and trialkanol-amines. Examples of suitable alkanol-amines are described in, for example, WO 00/32708. By preference, a dialkanol and more preferred diisopropanolamine (DIPA) is chosen.

The hyperbranched resin preferably has a amide group content (defined as the presence of NH—C=O or N—C=O in mmoles/100 g solid auto-oxidisable amide group containing resin) of ≤500 mmoles/100 g solid amide group containing resin, more preferably ≤400 mmoles/100 g solid amide group containing resin, most preferably ≤300 mmoles/100 g solid amide group containing resin and especially ≤225 mmoles/100 g solid amide group containing resin.

Examples of hydroxyl functional amines with both hydroxyl functionality and amine functionality are described in, for example, WO 00/32708, use of diisopropanolamine is preferred. These can be used to prepare polyesteramide resins.

Other methods for preparing hyperbranched or dendritic molecules are described in for example in Tomalia et al (Angewandte Chemie International Edition English, 1990, Vol 29, pp 138-175) and the Encyclopaedia of Polymer Science and Engineering, Volume Index 1990, pp 46-92. Another class of hyperbranched macromolecules are the so-called "star polymers" as described for example in U.S. Pat. No. 5,731,095. Hyperbranched polyesteramides are also described in for example EP 1440107 A1.

Polyesteramides may be obtained for instance by the inclusion of amino-alcohols such as ethanolamine in polyesterification mixtures. Polyesters which incorporate carboxy groups may be used, for example polyesters synthesised by esterification of dimethylol propionic acid (DMPA) and/or dimethylol butanoic acid (DMBA) with diols, provided that the esterification is carried out at temperatures below 200° C. to retain the carboxyl functionality in the final polyester.

The auto-oxidisable coating composition of the invention may comprise a liquid medium. By liquid medium herein is meant a low viscosity solvent such as water or organic (co-)solvent and mixtures thereof. These are generally referred to as diluents. The auto-oxidisable coating composition of the invention may thus be either waterborne or solventborne, depending on the majority of liquid medium used.

Non-limiting examples of suitable organic solvents are aliphatic, cycloaliphatic, and aromatic hydrocarbons, alcohol ethers, and alcohol ether acetates or mixtures thereof. As examples of such solvents may be mentioned hydrocarbon solvents available under the trademarks Shellsol H, Shellsol K, and Shellsol AB, all from Shell Chemicals, the Netherlands; the trademarked Solvesso 150, Exxsol D30, Exxsol D40 and Exxsol D60 solvents from Esso; ester solvents such as ethyl diglycol, ethyl glycol acetate, butyl glycol, butyl glycol acetate, butyl diglycol, butyl diglycol acetate, and methoxypropylene glycol acetate; and ketone solvents like methyl ethyl ketone (MEK), acetone, methyl isobutyl ketone (MIBK) and methyl amyl ketone (MAK). Mixtures of solvents may also be used. Preferably the solvent is an aliphatic solvent and most preferably the solvent is Exxsol D40.

Suitable organic solvents to dilute the air-drying alkyds of the invention also include aliphatic, cycloaliphatic and aromatic hydrocarbon solvents, ethers, alcohols, alcohol ethers, alcohol esters, ketones, hydroxyl ethers, N-methylpyrrolidone and mixtures thereof. However it may also be an aqueous carrier containing the auto-oxidisable resin in the form of an emulsion and a suitable emulsifier as is well known in the art.

Examples of solvents include water-miscible solvents such as propylene glycol based solvents, especially propylene glycol mono methyl ether and dipropylene glycol mono methyl ether and glycol ethers such as butyldiglycol.

A co-solvent, as is well known in the coating art, is an organic solvent employed in an aqueous composition to ameliorate the drying characteristics thereof, and in particular to lower its minimum film forming temperature. The co-solvent may be solvent incorporated or used during preparation of the auto-oxidisable resin or may have been added during formulation of aqueous solution coating composition.

An organic solvent may optionally be added before, during and/or after the polymerisation process for making the auto-oxidisable resin and the auto-oxidisable coating composition to control the viscosity.

Also reactive diluents may be used as solvents. By reactive diluent herein is meant a solvent comprising functionality able to react in the drying process with the unsaturated fatty acid residue comprising polymer b). Thus, the reactive diluent is not co-reacted directly with the polymer, but participates to the drying process. Examples of such reactive diluents are for instance vinyl monomers described herein.

In an embodiment according to the invention the auto-oxidisable resin has unsaturated fatty acid residues (air-drying groups) in combination with (meth)allyl functional residues, β-keto ester groups, β-keto amide groups and any combinations thereof.

The unsaturation imparts latent cross-linkability so that when a coating composition thereof is dried in the air in conjunction with the Mn drier salt, the coating material undergoes cross-linking by auto-oxidation.

The main crosslinking mechanism of the composition according to the invention is by auto-oxidation, optionally in combination with other crosslinking mechanisms as discussed herein to give a dual (or multiple) curing.

By cross-linking by auto-oxidation is meant that cross-linking results from an oxidation occurring in the presence of air and usually involves a free radical mechanism and is preferably metal-catalysed resulting in covalent cross-links.

By auto-oxidisable is meant that the components can cross-link as a results from oxidation occurring in the presence of air and usually involving a free radical mechanism. Auto-oxidation (also known as air-drying) is preferably metal-catalysed resulting in covalent cross-links. Suitably auto-oxidation of the auto-oxidisable material and the urethanised resin in the coating composition according to the invention is provided by air-drying groups that ensure the occurrence of auto-oxidation.

Additionally to the curing by auto-oxidation, crosslinking may occur at ambient temperature by a number of other, secondary crosslinking mechanisms including but not limited to the reaction of siloxane functional groups, Schiff base crosslinking, Michael type additions and radical polymerisation as are well known in the art. By Schiff base crosslinking is meant that crosslinking takes place by the reaction of a carbonyl functional group(s), where by a carbonyl functional group herein is meant an aldo or keto group and including an enolic carbonyl group such as is found in an acetoacetyl group, with aldehydes, which are a by-product of oxidative curing.

Examples of carbonyl-reactive amine (or blocked amine) functional groups include ones provided by the following compounds or groups: R—$NH_2$, R—O—$NH_2$, R—O—N=C<, R—NH—C(=O)—O—N=C< and R—NH—C(=O)—O—$NH_2$ where R is optionally substituted $C_1$ to $C_{15}$, preferably $C_1$ to $C_{10}$ alkylene, optionally substituted alicyclic or optionally substituted aryl, or R may also be part of a polymer. Examples of carbonyl-reactive hydrazine (or blocked hydrazine) compounds or groups include R—NH—NH$_2$, R—C(=O)—NH—NH$_2$, R—C(=O)—NH—N=C<, R—NH—C(=O)—NH—NH$_2$ and R—NH—C(=O)—NH—N=C< where R is as described above.

Other crosslinking mechanisms known in the art include the reaction of epoxy groups with amino, carboxylic acid or mercapto groups, the reaction of amine, β-keto ester groups or mercapto groups with ethylenically unsaturated groups such as fumarate and acryloyl groups, the reaction of mercapto groups with ethylenically unsaturated groups such as unsaturated fatty acids, the reaction of masked epoxy groups with amino or mercapto groups, the reaction of isothiocyanates with amines, alcohols or hydrazines, the reaction of amines (for example ethylene diamine or multifunctional amine terminated polyalkylene oxides) with β-diketo (for example acetoacetoxy or acetoamide) groups to form enamines. The use of blocked crosslinking groups may be beneficial.

Such secondary curing mechanisms may be ensured by providing the unsaturated fatty acid functionalized polymer b) with other functional groups that may provide further crosslinking, resulting in an even faster drying process of the coating composition.

Preferably a significant part of any crosslinking reaction only takes place after application of the coating composition to a substrate, to avoid an excessive molecular weight build up which may lead to an increased viscosity of the coating composition on the substrate in the early stages of drying. Even worse, the viscosity can become too high to apply the coating composition and in the worst case the composition will gel in the can.

The auto-oxidative curing of the composition according to the invention preferably takes place at ambient temperature. The ambient (room) temperature at which the coating is dried is meant in the context of this invention to be a temperature in a range from 0 to 40° C., preferably from 5 to 35° C. and most preferably from 10 to 30° C. Experimental measurements to test the coating compositions were typically done at room temperature of 20+/−5° C., preferably at a room temperature of from 23 to 25° C., unless otherwise stated.

In a further aspect the invention is directed to a method for preparing an auto-oxidisable coating composition of the invention comprising for example mixing at elevated temperature the auto-oxidisable resin with the manganese carboxylate complex drier of the invention. The mixing of the components may be done in any order.

The composition of the invention is particularly suitable for use in coatings or coating compositions in which it may provide a key part of coating compositions or formulations. Such coating compositions can be pigmented or unpigmented and may be used as primer, as a topcoat, as a high-gloss or matt coating, as a stain-resistant coating, a wood oil, a wall paint or a flooring paint.

In yet a further aspect the invention is directed to a paint comprising an auto-oxidisable coating composition according to the invention. The term "paint" in this respect is meant to designate collectively coating materials such as paints, varnishes, enamels, and the like lacquer for architectural or industrial use for indoor as well as for outdoor applications.

Accordingly, in a further embodiment of the invention there is provided a coating, a polymeric film, a printing ink and/or an overprint lacquer obtainable from the coating composition of the present invention.

The composition of the invention may be used in various applications, and for such purposes may be further optionally combined or formulated with other additives or components (to form compositions), such as pigments (for example titanium dioxide, iron oxide, chromium based compounds and/or metal pthalocyanine compounds), dyes, defoamers, rheology control agents, thixotropic additives, thickeners, dispersing and stabilising agents (usually surfactants), heat stabilisers, matting agents such as silica, wetting agents, leveling agents, anti-cratering agents, fillers, extenders, sedimentation inhibitors, UV absorbers, antioxidants, drier salts, fungicides, bacteriocides, waxes, organic co-solvents, wetting agents and the like introduced at any stage of the production process or subsequently. It is possible to include an amount of antimony oxide to enhance the fire retardant properties.

The air drying autoxidisable resin composition of the invention may contain an antiskinning compound or antioxidant. This may be added to the composition before, after or at the same time as adding the aqueous solution of the manganese drier. Examples include but are not limited to methylethylketoxime, acetonoxime, butyraldoxime, dialkylhydroxylamine, cyclohexanoneoxime or mixtures thereof. Where present, the concentration of antioxidant or antiskinning compound applied is preferably in a range from 0.001 to 2 wt %.

The composition of this invention may also contain various other ingredients such as extenders (e.g. calcium carbonate and china clay) and dispersants such as pigment dispersion aids.

Such additives are commercially available. However, it is to be understood that these additives are not needed to obtain the properties as described in this invention and they are not added when they negatively affect the coating properties.

In a further aspect the invention is directed to a method of coating a substrate with a auto-oxidisable coating composition according to the invention, which comprises adding to the coating composition the manganese carboxylate complex drier according to the invention, applying the auto-oxidisable coating composition on a substrate and drying the composition in the presence of air to obtain a coating. The coating according to the invention may be a primer coating or a topcoat.

The composition once applied may be allowed to dry naturally at ambient temperature, but the drying process may be accelerated by heat at a temperature above ambient temperature. Especially in the case of dual curing, acceleration of the drying by means of by heat is very useful.

In yet a further aspect the invention is directed to a substrate coated with the auto-oxidisable coating composition of the invention. Suitable substrates include wood, metal, stone, plastics and plastic films like polyethylene or polypropylene, especially when the films are treated with plasma; fibre (including hair and textile), glass, ceramics, plaster, asphalt, concrete, leather, paper, foam, masonry and/or board. Wood and wooden based substrates like MDF (medium density fibreboard) or chip boards are the most preferred substrates.

Application to a substrate may be by any conventional method including brushing, dipping, flow coating, spraying, roller coating, pad coating, flexo printing, gravure printing, ink-jet printing, any other graphic arts application methods and the like. For spraying, further dilution of the composition with a suitable solvent (for example acetone) may be needed to achieve the best results.

There is further provided according to the invention a substrate carrying a pigmented or non-pigmented coating derived from a coating composition of the invention.

The auto-oxidisable coating composition of the invention can further be advantageously applied in one or more of the following applications: adhesives (such as pressure sensitive adhesives, hot melt, contact and laminating adhesives or adhesion promoters), high yield primers, high yield topcoats, high gloss coatings, matt coatings, stain resistant coatings, wood oil, wall paint, flooring paint, metal applications as used already for alkyds (coils, drums, chairs), inks, toners, wetting agents, pigment dispersants, paper coatings, automotive protective and maintenance, flexible packaging, coil coatings, sheet moulding, powder coatings, and spray paints.

The present invention is now further illustrated but in no way limited by reference to the following examples. Unless otherwise specified all parts, percentages and ratios are on a weight basis. The term comparative means that it is not according to the invention.

EXPERIMENTAL

Tests

Drying was determined using the so called cotton wool test for dust free time (DFT, a piece of cotton wool was dropped on the coating, after 10 sec the plate was turned upside and when the cotton wool falls from the coating within 10 sec the coating is dust-free) and tack free time (TFT, a piece of cotton wool was pressed on the coating during 10 sec with a force of 1 kg/cm2, the plate was turned upside and when the cotton wool falls from the coating within 10 sec the coating is tack free)

Materials Used

Noudex Combi BSR is a commercial cobalt based dryer and available from Rockwood.

Mn ethylhexanoate in mineral spirits (6.05% in spirits) was obtained from ABCR.

Picolinic acid, bipyridine, acetylacetone and ascorbic acid were obtained from Aldrich.

Comparative MnMeTACN$^{2+}$ (PF$_6^-$)$_2$ Complex

The Mn complex MnMeTACN$^{2+}$ (PF$_6^-$)$_2$ can be prepared analogously to the reference K. Wieghardt et al, J. Am. Chem. Soc. 110, 7398-7411 (1988), or obtained commercially from Rahu catalytics, with a structure as shown below:

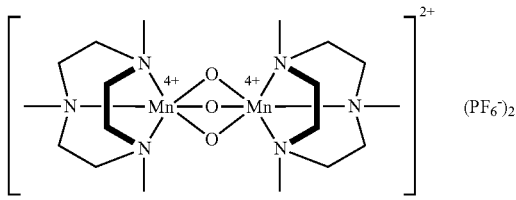

Mn Carboxylate Complexes A (MnMeTACN$^{2+}$ (OAc$^-$)$_2$) According to the Invention The structure of complex A is shown below.

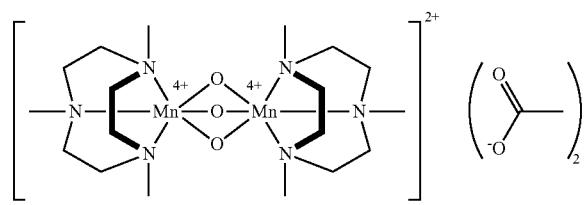

This complex can be commercially obtained from Rahu Catalytics as a 3.5% solution in water. Most of the water was evaporated at 50° C. under reduced pressure until a concentration of 20.4% was obtained.

Examples 1 and Comparative Example A-E

Clear, Non-Pigmented Coatings

As polymer b) the alkyd resin Uralac Z423 (available from DSM NeoResins BV as 60% resin in Exxsol D40) was used. The amount of drier was 5 mmol transition metal/kg solid resin based only on Co and/or Mn.

The drier complexes A was used as the concentrated water solution. MnMeTACN$^{2+}$ (PF$_6^-$)$_2$ was used as 10% solution in acetone.

After the addition of the driers by mixing into the resin, the resin was stored overnight. Next the resin was applied as 100 micron wet films on a glass plate using a doctor blade and the drying was monitored.

As can be clearly seen from table 1 below, only with the transition metal driers according to the invention a fast and efficient drying (dust free time DFT, tack free time TFT).

TABLE 1

| Example | Catalyst | DFT hours | TFT hours |
| --- | --- | --- | --- |
| 1 | A | 1.1 | 1.55 |
| Comp A | MnMeTACN$^{2+}$ (PF$_6^-$)$_2$ | 6 | >8 |
| Comp B | Mn/picolinic acid | 6.25 | >8 |
| Comp C | Mn ethyl-hexanoate | >8 | |
| Comp D | Mn/Bipyridine/AcAc | 2.75 | >8 |
| Comp E | Combi BSR | 2.5 | 3.5 |

The experimental results demonstrate that the catalyst according to the invention is capable of a rapid drying whilst the known Mn based driers are not as efficient. Especially when comparing example 1 to comparative example A, where only the counterion of the manganese carboxylate complex was different, it is surprising that the drying properties of the resin were different to such a large extent. Furthermore this demonstrates that compared to a standard commercial Co based drier cocktail, (Comparative E) the drier according to the invention is more efficient.

Examples 2-4 and Comparative Example F-H

Clear, Non-Pigmented Coatings

As polymer b) the alkyd resin Uralac Z423 (available from DSM NeoResins BV as 60% resin in Exxsol D40) was used.

For all experiments, the Exxcol D40 was evaporated under reduced pressure and next the resin was dissolved in the used solvents via which resin solutions containing 65% solids were obtained.

The amount of drier was 2 mmol Mn metal/kg solid resin (i.e. 1 mmol Mn complex/kg solids) based only on Mn.

The drier complexes A was used as the concentrated water solution. MnMeTACN$^{2+}$ (PF$_6^-$)$_2$ was used as 10% solution in acetone.

After the addition of the driers to the resin the resin was stored overnight. Next the resin was applied as 100 micron wet films on a glass plate using a doctor blade and the drying was monitored.

As can be clearly seen from the table below, only with the transition metal driers according to the invention a faster and more efficient drying was obtained, as compared to the known manganese complex having $(PF_6^-)_2$ as anion.

TABLE 2

| | Example | | | | | |
|---|---|---|---|---|---|---|
| | 2 | F | 3 | G | 4 | H |
| solvent | | | | | | |
| Exxcol D40 | X | X | | | | |
| Dowanol PM | | | X | X | | |
| DMSO | | | | | X | X |
| drier | | | | | | |
| A | X | | X | | X | |
| MnMeTACN$^{2+}$ (PF$_6^-$)$_2$ | | X | | X | | X |
| DFT* | 1.8 | 5 | 1.5 | 3 | 2.8 | 4.3 |
| TFT* | 3.16 | >7 | 2.4 | 6.25 | 3.8 | 5 |

*DFT = dust free time, TFT = tack free time

It can be seen from table 2, that in all cases the drier according to the invention surprisingly outperforms the prior art MnMeTACN$^{2+}$ (PF$_6^-$)$_2$ drier.

Example 5-6

Example 3 was repeated except that besides catalyst A also ascorbic acid palmitate was added before storing the resin overnight in order to prepare a bridged carboxylate of the manganese carboxylate complex according to formula (VI) in situ (R1, R2=CH3, R=polymeric residue).

TABLE 3

| Example | 3 | 5 | 6 |
|---|---|---|---|
| Molar Ratio A/cocat | 1/0 | 1/1 | 1/2 |
| DFT | 1.5 | 1 | 1 |
| TFT | 2.4 | 2.08 | 2.08 |

These examples demonstrate that the drying can be further improved when a bridged carboxylate of the manganese carboxylate complex is used as drier. Further more these examples demonstrate that this bridge carboxylate can be a polymeric residue and that these bridge carboxylates can be prepared in situ Example 7-8

Preparation of Catalyst Complex B

To 26.49 g (MnMeTACN$^{2+}$ (OAc$^-$)$_2$ (complex A, 3.5% solution in water, commercially obtained from Rahu Catalytics) was added 0.264 g butyric acid and 0.279 g ascorbic acid. The mixture was stirred and allowed to stand overnight after which a water solution of catalyst complex B was obtained. (Formula VI; R=C3 H7, R1=CH3, R2=CH3, X=OC(C3H7)O).

To 50 g of Uradil AZ516 (waterbased resin, commercially available from DSM Neoresins) was added 90.1 mg of catalyst A or 540.7 mg of the above prepared solution of catalyst B.

After the addition of the driers to the resin the resin was stored overnight. Next the resin was applied as 100 micron wet films on a glass plate using a doctor blade and the drying was monitored.

The resulting drying characteristics were:

| Example 7 | catalyst A | DFT 3.5 hrs | TFT 6 hrs |
| Example 8 | catalyst B | DFT 2.8 hrs | TFT 3.8 hrs |

These example indicates that the compositions according to the invention can also be used in waterbased coatings. Furthermore comparing example 7 with 8 demonstrates that in case a carboxylate is bridged between the 2 manganese atoms (X, Y=OC(R)O) the complex is even more efficient.

Example 9

White Paint 17.55 g Titanium dioxide (Kronos TR92), and 0.16 g Nuosperse FA601 and 4.26 g Exxsol D40 were dispersed into 25.49 g Uralac HS233 Q85 (a solvent based alkyd resin available from DSM NeoResins BV, 85 wt % solids) by using a dispermat.

Next 0.92 g of the above prepared solution of complex B, 0.94 g Nuodex Ca 5% and 0.2 g Exkin II were mixed in after which the mixture was allowed to stand overnight.

The amount of dryer was 2 mmol Mn/kg (based on total resin composition)

The drying characteristics of a 100 micron wet film were DFT 2.5 hrs, TFT 3 hrs.

The film showed no wrinkles also not when applied as a 200 micron thick film. And the liquid formulation exhibited no skin formation after a storage time of 21 days at room temperature.

For comparison a formulation was made with the same drying characteristics but based on cobalt. In this case 0.21 g Nuodex Co10%, 0.94 g Nuodex Ca 5%, 0.8 g Nuodex Zr 12% and 0.2 g Exkin II had to added. The amount of dryer was 7 mmol Co/kg and 21 mmol Zr/kg (based on total resin composition).

This example indicates that manganese carboxylate complex a) according to the invention act as very effective driers for air drying auto-oxidative resin composition comprising a polymer having unsaturated fatty acid residues.

The invention claimed is:

1. An air drying auto-oxidisable resin composition comprising components:
   a) a drier comprising a manganese carboxylate complex, and
   b) a polymer comprising unsaturated fatty acid residues selected from the group consisting of alkyds, vinyl polymers, polyurethane resins, hyperbranched resins and mixtures thereof, wherein
   the manganese carboxylate complex has the following structure (III):

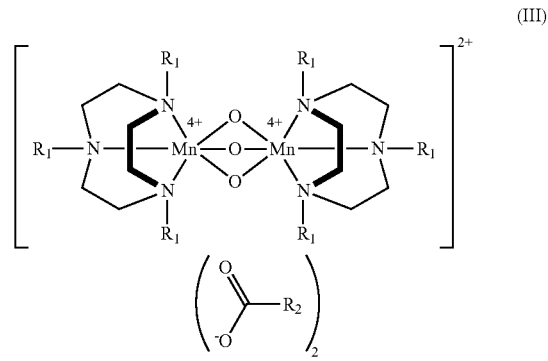

wherein

R₁=H or C1-C20 alkyl; and

R₂=C1-C20 alkyl; and wherein the cation of the manganese carboxylate complex is present in an amount of 0.001 wt. % to 0.5 wt. %, based on total solids content of the polymer b).

2. A composition according to claim 1, wherein the manganese carboxylate complex has the following structure IV:

(IV)

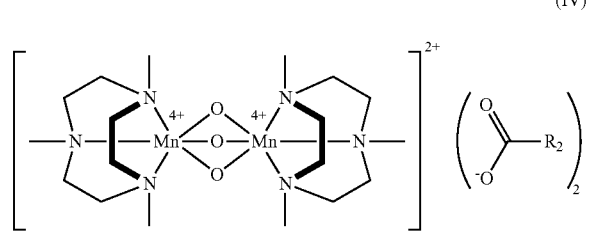

wherein

R₂=C1-C20 alkyl.

3. A composition according to claim 1, wherein the manganese carboxylate complex has the following structure V:

(V)

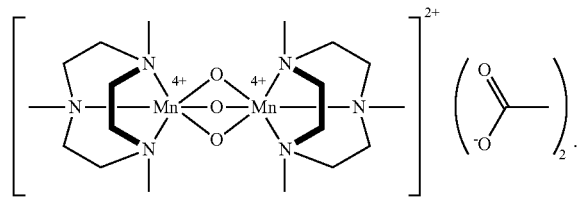

4. A composition according to claim 1 wherein R₂ is CH₃.

5. A composition according to claim 1 wherein the composition further comprises a liquid medium selected from the group consisting of water, aliphatic hydrocarbon solvents, aromatic hydrocarbon solvents, ethers, alcohols, ketones, hydroxyl ethers and mixtures thereof.

6. A coating composition comprising the auto-oxidisable resin composition according to claim 1.

7. A coating composition according to claim 6 which is in a form selected from the group consisting of paints, adhesives, lacquers, inks and varnishes.

8. A substrate coated with a composition according to claim 1.

9. A method of coating a substrate comprising applying the coating composition according to claim 6 onto a substrate, and drying the coating composition in the presence of air to obtain a coating on the substrate.

\* \* \* \* \*